UNITED STATES PATENT OFFICE.

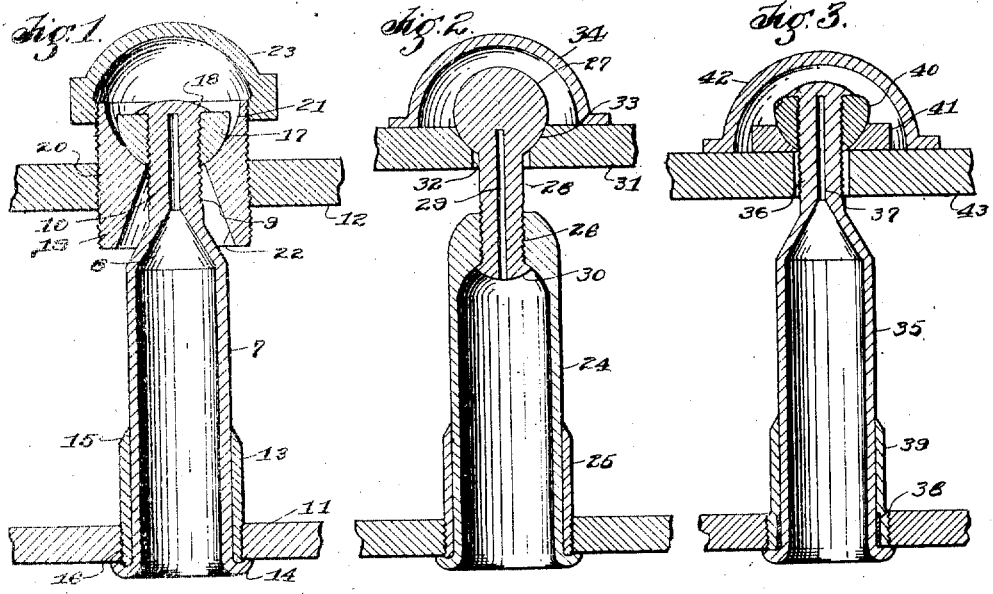
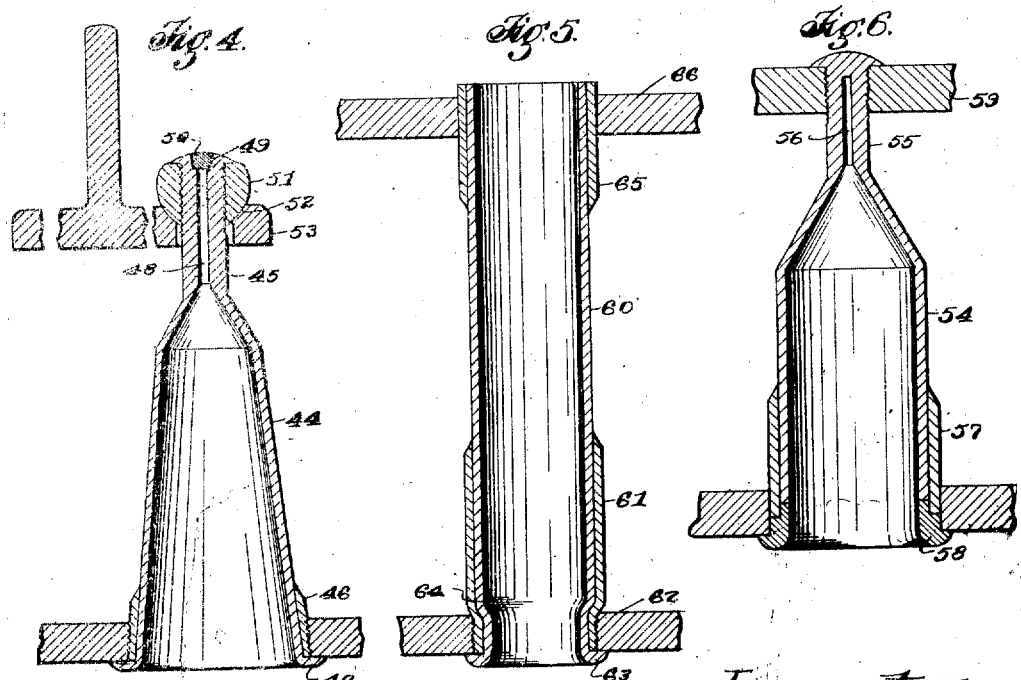

MIGUEL PASCALE, OF TUCSON, ARIZONA.

BOLT FOR BOILERS.

1,275,084.

Specification of Letters Patent.

Patented Aug. 6, 1918.

Application filed July 11, 1916. Serial No. 108,539.

*To all whom it may concern:*

Be it known that I, MIGUEL PASCALE, a citizen of the United States, residing at Tucson, in the county of Pima, State of Arizona, have invented new and useful Improvements in Bolts for Boilers, of which the following is a specification.

This invention relates to bolts for boilers, and pertains particularly to the shank construction, and means for securing the end of the shank to a sheet such as the fire box sheet.

It is an object of this invention to provide a construction suitable for stay and crown bolts which will act to give a greater radiating surface for heat from the fire box.

It is another object of this invention to provide bolts of the character above described with tell-tale means whereby if a bolt breaks it can be located by the water or steam spitting into the fire box.

It is a further object of this invention to provide a construction of the character described whereby the connection of the bolt to the fire box sheet may be easily and securely made, thereby obtaining a non-leak joint, and whereby the liability of breaking of the shank at the sheet will be minimized. This feature of construction is also adaptable for securing flues to sheets.

A still further object of this invention is to provide a hollow crown bolt or the like with tell-tale means and a fusible plug to operate the tell-tale on a rise of temperature to a predetermined point. This rise of temperature may be due to various causes well known in the art.

I accomplish these objects by means of the embodiments of my invention illustrated in the accompanying drawing, in which:

Figure 1 is a longitudinal section of a stay bolt.

Fig. 2 is a longitudinal section of a stay bolt with a modified form of head.

Fig. 3 is a longitudinal section of a stay bolt with a further modified form of head.

Fig. 4 is a cross sectional view of a crown bolt.

Fig. 5 is a longitudinal section of a flue embodying the features of my invention.

Fig. 6 is a longitudinal section of a repair bolt.

Referring particularly to Fig. 1, the shank of the bolt is indicated by 7 and is of tubular form. The bore tapers at the upper end as indicated by 8, and the external diameter is reduced and threaded as indicated by 9 to form a stem. Extending longitudinally of the bolt and situated in the stem is a telltale bore 10. The numeral 11 indicates a fire box sheet, and 12 the boiler shell. The space between sheets 11 and 12 is, as well known, filled with water. The open end of the shank communicates with the fire box.

A sleeve 13 is placed upon the shank 7 and extends to a point spaced from the open end of the shank, leaving an extension 14 which is beaded over the sheet. The sleeve is preferably welded near the upper end 15 to the shank, the lower end is externally threaded as indicated by 16. The bolt is threaded into the hole formed in the fire box sheet and beaded over to provide a non-leak joint. The sleeve 13 forms a connection such that breaking of the shank at the sheet 11 due to a relative movement between the shank and sheet will be minimized. There is also less liability to rust at the juncture of the sheet and bolt. In effect, the sleeve provides some flexibility for the connection between the fire box sheet and the bolt.

It will be noted that the tell-tale bore 10 does not open through the head end of the stem. A head 17 having a surface of curved form and preferably forming part of the surface of a sphere is threaded on to the end of the bolt and the shank is then up-set or riveted as indicated by 18 to lock the head to the shank. A socket sleeve 19 having threads on its exterior is engaged with a threaded hole 20 in the sheet 12. The socket sleeve has a substantially half-round bore 21 of slightly greater curvature than the head 17. A flaring bore 22 extends through the socket sleeve and connects with the bore 21 so that head 17 forms with bore 21 a flexible joint. The flaring bore 22 permits rocking of the bolt shank. Threaded on to the socket sleeve 19 is a cap 23 completing the bolt.

It is obvious that the construction at the head end permits movement of the bolt as the sheet moves due to expansion and contraction or other causes. The curvature of the head 17 being less than the curvature of the bore 21, the head will bear upon the wall of the bore only a slight amount and a tight joint will be formed.

Referring to Fig. 2, the shank 24 is hollow, and a sleeve 25 is provided as in the construction shown in Fig. 1. A threaded bore 26 communicates with the bore of the shank. A ball head 27 is provided with a stem 28 which is threaded adjacent the end and engages with the threaded bore 26. The stem is provided with a longitudinally extending tell-tale hole 29. The stem is threaded into the bore and the end riveted over as indicated by 30, forming a secure connection. The sheet 31 has a bore 32 of greater diameter than the external diameter of stem 28, and a counterbore 33 of round form which serves as a socket for the ball 27. A cap 34 is welded to the sheet 31.

Referring to Fig. 3, the shank 35 is constructed with a reduced portion 36, and a tell-tale hole 37, as is the bolt, shown in Fig. 1. A ferrule 38 preferably of copper is interposed between the sleeve 39 and the shank 35; copper being a ductile material, it will assist in forming a tight joint. A half-round head 40 is threaded on to the shank and the shank riveted over as in the construction shown in Fig. 1. A washer 41 having a curved bore provides a socket for the head 40. Cap 42 is welded to the sheet 43.

Fig. 4 illustrates a crown bolt which has a tapering shank 44. This shank is hollow and provided with a stem 45 of reduced diameter. Adjacent the open end of the shank is a sleeve 46 which is threaded on its exterior and welded to the shank. The end 47 is beaded over the crown sheet, as in the constructions before described. A tell-tale bore 48 communicates with the hollow portion of the shank and extends through the stem end having a tapered counterbore 49 at its end in which is placed a fusible plug 50; this being soldered to the shank or secured thereto in any other suitable way. Upon the plug 50 being exposed because of lack of water or becoming heated for any other cause the plug melts. This causes steam or water to spit into the fire box indicating the water is low, or that there is other trouble, also relieving the pressure and thereby safeguarding the boiler. A half-round head 51 is threaded on to the stem 45 and the latter riveted over. The head rests in a socket 52 formed in a stay 53, thus providing a flexible head.

Fig. 6 illustrates a repair bolt which has a hollow shank 54, a stem 55 of reduced diameter having a tell-tale bore 56 which is closed at the head end of the stem. A sleeve 57 is welded on to the shank 54. This sleeve overlaps the end of the shank. A bead member 58 is welded to the sleeve 57 and the shank 54. When joined before welding the beaded sleeve and shank have a stepped connection, but when the weld is effected, the joint, due to the melting of the parts, will be practically a line. The head end of the stem 55 is threaded into the sheet 59 and riveted over.

In the substitution of a repair bolt for one of my bolts before described, it would be necessary to thread out the bolt hole in the boiler sheet and if the bolt hole is not of sufficient diameter it would first have to be reamed. The repair bolt is then placed in position by threading it into the boiler sheet and then riveting over the end.

It is obvious that the hot gases from the fire box will enter the hollow bolt and provide increased heating surface for the water within the boiler, thereby increasing the efficiency of the boiler. If a break occurs in the shank of the bolt, steam will enter the fire box. If this break occurs at the stem end of the shank, a position where it is most likely to occur, the tell-tale hole admits water or steam to the bore of the shank and allows the latter to spit into the fire box, thereby indicating the bolt which is broken.

In Fig. 4 a fusible plug has been shown closing the tell-tale. This fusible plug may be substituted in any other of the constructions shown when those constructions are used in places liable to injury by overheating. The copper ferrule may also be used in each one of the constructions described. I do not limit my invention to the sleeve placed upon the shank, as the sleeve may be made integral with the shank.

Fig. 5 shows a fire tube 60 forming a flue. The fire tube has a sleeve 61 placed adjacent its end as in the bolt construction. The sleeve is threaded on its exterior to engage threads in the flue sheet 62. The extension 63 is beaded over as in the bolt, and in order to provide additional security the tube is expanded as indicated at 64. A sleeve 65 is placed upon the other end of the tube and preferably secured thereto by welding. The sleeve has a sliding connection with the sheet 66. The construction just described is such that the tube will not easily break. A certain degree of flexibility is afforded between the connections of the tube and sheets. The joint formed is non-leak, and there is little liability of rusting and breaking of the tubes at the sheets.

What I claim is:

1. A bolt having a hollow shank open at one end, a tell-tale bore communicating with the hollow shank closed at the head end thereof by a fusible plug.

2. In a boiler, a tubular member open at one end, a sleeve secured thereto adjacent said open end to enlarge the same, a ferrule of ductile material interposed between said sleeve and tubular member, and an extension of said member adapted to be beaded.

3. A bolt having a hollow shank open at one end, a tell-tale bore communicating with the hollow shank and closed at the head end thereof, said shank being of enlarged diameter and thickness adjacent the open end thereof, and an extension of said shank adapted to be beaded.

4. A bolt having a hollow shank open at one end, a tell-tale bore communicating with the hollow shank and closed at the head end thereof, a sleeve mounted adjacent said open end to thicken the same, and an extension of said hollow shank adapted to be beaded.

5. A bolt having a hollow shank open at one end, a tell-tale bore communicating with the hollow shank and closed at the head end thereof, a sleeve mounted adjacent said open end to thicken the same, a ferrule of ductile material interposed between said sleeve and hollow shank, and an extension of said hollow shank adapted to be beaded.

6. A bolt having a hollow shank open at one end, a tell-tale bore communicating with the hollow shank and closed at the head end thereof by a fusible plug, said shank of enlarged diameter and thickness adjacent the open end thereof, and an extension of said shank adapted to be beaded.

7. A bolt having a hollow shank open at one end, a tell-tale bore communicating with the hollow shank and closed at the head end thereof by a fusible plug, a sleeve mounted on said shank adjacent said open end to thicken the same, and an extension of said hollow shank adapted to be beaded.

8. A bolt having a hollow shank open at one end, a tell-tale bore communicating with the hollow shank and closed at the head end thereof by a fusible plug, a sleeve mounted on said shank adjacent said open end to thicken the same, a ferrule of ductile material interposed between said sleeve and hollow shank and an extension of said member adapted to be beaded.

In witness that I claim the foregoing I have hereunto subscribed my name this 29th day of June, 1916.

MIGUEL PASCALE.